United States Patent

Beck

[15] 3,677,535

[45] July 18, 1972

[54] AXIAL SUSPENSION SYSTEM THAT ACCOMMODATE RELATIVE LATERAL MOVEMENT

[72] Inventor: Merrill G. Beck, Erie, Pa.

[73] Assignee: Lord Corporation, Erie, Pa.

[22] Filed: Aug. 24, 1970

[21] Appl. No.: 66,365

[52] U.S. Cl. ............................................. 267/63, 267/153
[51] Int. Cl. ............................................................ F16f 1/40
[58] Field of Search ................................... 267/63 V, 153 V

[56] References Cited

UNITED STATES PATENTS

| | | | |
|---|---|---|---|
| 2,623,745 | 12/1952 | Premoli | 267/63 |
| 3,120,382 | 2/1964 | Paulsen | 267/63 |
| 2,639,141 | 5/1953 | Gabriel | 267/63 |

*Primary Examiner*—James B. Marbert
*Attorney*—James W. Wright

[57] ABSTRACT

A plurality of superimposed precompressed resilient pad means are disposed between normally axially spaced support and supported members. An elongate guide member is operatively disposed through the superimposed resilient pad means for maintaining alignment therebetween and is operatively associated with the support and supported members for permitting relative axial, lateral and axially out-of-parallel movement therebetween. The resilient pad means are alternatively compressible and expandable in response to relative axial or axially parallel movement between the support and supported members for absorbing substantially all of such relative movement therebetween while cooperating with the guide member and support and supported members for permitting relative lateral and cocking or axially out-of-parallel movement between the support and supported members. Each of the plurality of superimposed resilient pad means are so constructed as to have a load-deflection rate which increases with load to provide improved operating performance of the suspension system.

13 Claims, 5 Drawing Figures

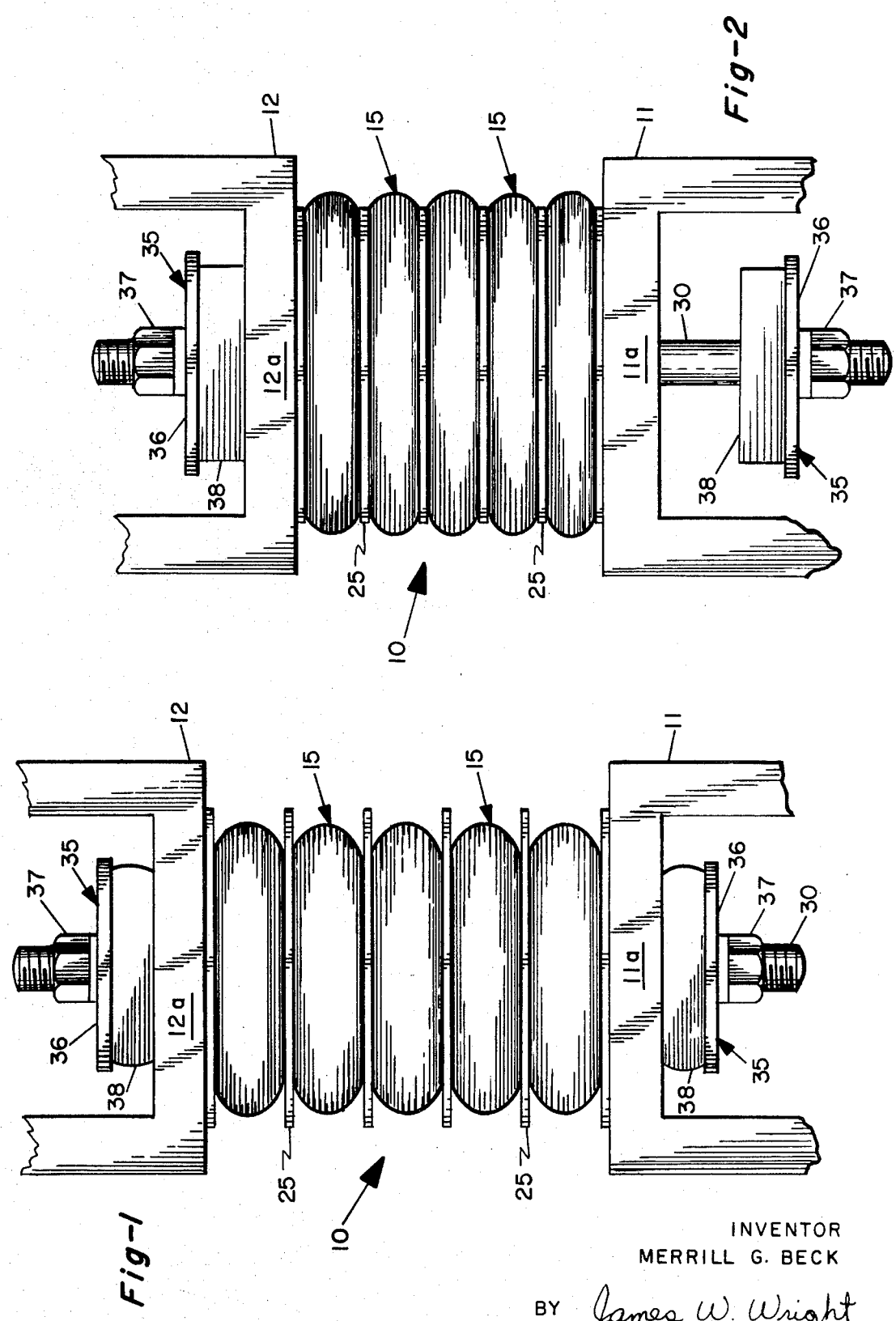

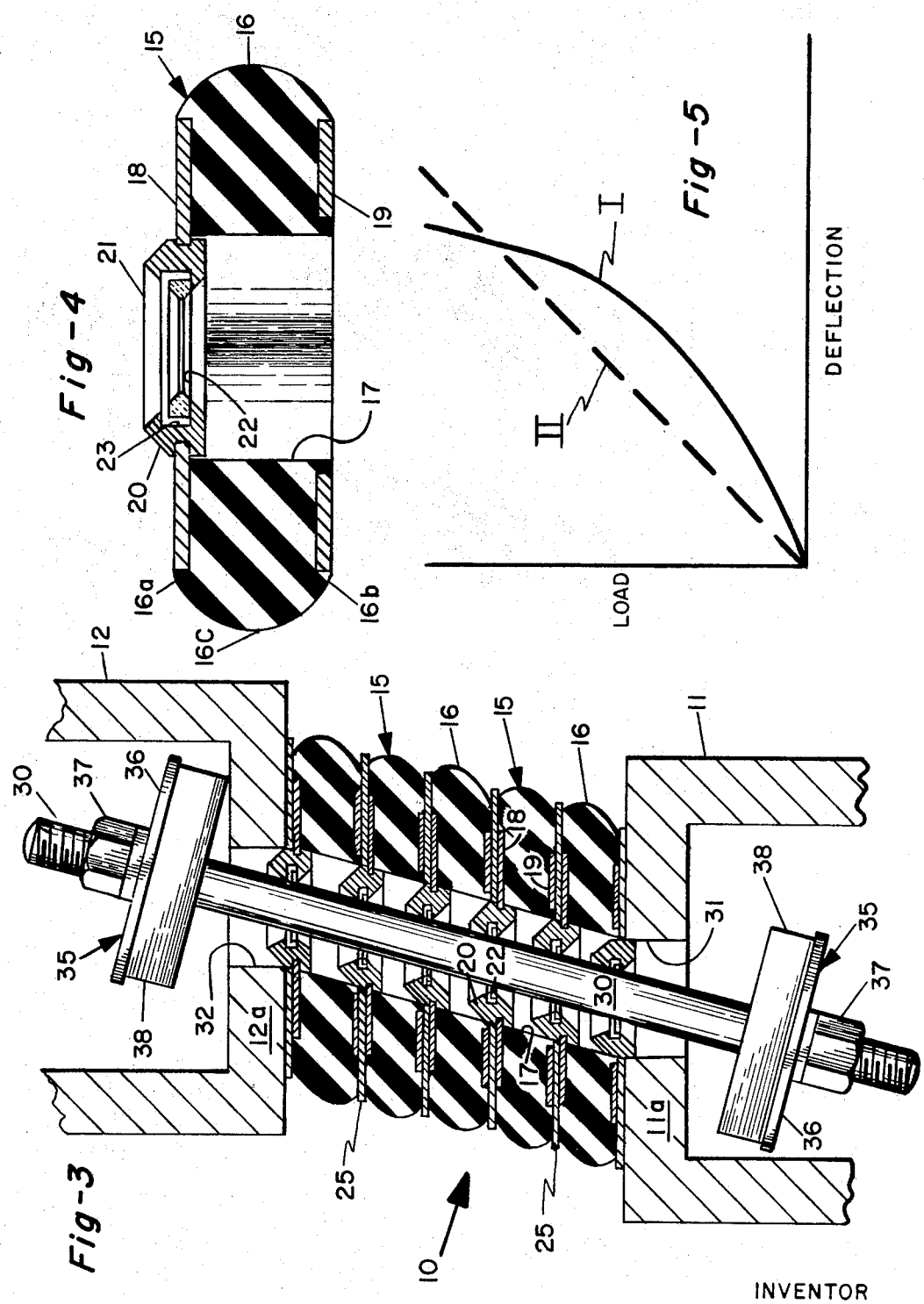

AXIAL SUSPENSION SYSTEM THAT ACCOMMODATE RELATIVE LATERAL MOVEMENT

This invention relates in general to a suspension system for a vehicle or the like and more particularly to an axial suspension system that accommodates relative lateral and axially out-of-parallel movement between support and supported members and provides for improved operating performance.

Conventionally, suspension systems for absorbing shock have heretofore been formed from spring and hydraulic devices. Spring devices are frequently damaged and rendered inoperative such as by fatigue and thus, require frequent replacement. Furthermore, the manufacture of spring devices which will simultaneously accommodate various loading and space requirements has presented numerous problems. Another common problem with spring devices is that upon receipt of large or excessive shock loads, the spring devices often bottom out and thus cause a severe shock to that being suspended. In addition, the load deflection properties of spring devices are usually such that when utilized in light weight vehicles that carry heavy loads, such as off-highway vehicles and the like, the spring devices do not function satisfactorily in both the unloaded and loaded condition. That is, if the spring device is designed to provide a smooth ride under a fully loaded condition, then a rough ride is the result in the unloaded condition. While hydraulic devices have alleviated some of the shortcomings of spring devices, they have their disadvantages. In addition to usually being more expensive than spring devices, fluid maintenance is a typical problem.

Recent approaches have been taken to form suspension systems from resilient or elastomeric pads, which suspension systems alleviate many of the common disadvantages of spring and hydraulic devices. Typically, a plurality of superimposed resilient pads are operatively disposed within telescoped inner and outer housings. The telescoped housing provide means for connecting the resilient pads to the support and supported members, control the type deformation in the resilient pads, maintain alignment of the pads and prevent buckling thereof. It will be apparent in suspension systems of this type that when loaded in compression, the resilient pads may bulge or buckle outwardly into frictional contact with the housings to interfere with operation of the suspension system and cause undue wear and damage to the resilient pads and perhaps the housings as well. Also, these suspension systems are not frequently designed to accommodate relative lateral or axially out-of-parallel movement or absorb any lateral shock between the support and supported members. Where these suspension systems are designed to accommodate relative lateral movement and/or absorb lateral shock between the support and supported members, the housings must be suitably coupled to the support and supported members. This necessitates the provision of suitable connections or couplings which carry the load of the supported member, which connections or couplings are subject to maintenance problems.

The present invention provides an improved suspension system including a plurality of superimposed resilient pads which does not necessitate telescoped housings for confining the pads or load carrying connections or couplings between the support and supported members while accommodating relative axial, lateral and axially out-of-parallel movement between the support and supported members and in some instances absorbing lateral shock therebetween. The suspension system of this invention thus includes fewer structural elements and connections, cost less, has less maintenance problems and accommodates various movements between the support and supported members. To further improve the suspension system, the resilient pads utilized are preferably designed such that they have load-deflection rates that increase with load and thus when used in a suspension system for light weight vehicles that carry heavy loads, the suspension system will perform satisfactorily in both the unloaded and loaded condition.

In accordance with the foregoing, it is an object of the present invention to provide a novel suspension system for carrying axial loads between support and supported members while permitting relative lateral movement and where necessary axially our-of-parallel movement therebetween.

It is another object of the present invention to provide a suspension system utilizing resilient pads which does not require telescoped housings and suitable load carrying connections or couplings between the housings and the support and supported members.

It is another object of this invention to provide a suspension system utilizing a plurality of normally axially aligned superimposed resilient pads which permits relative lateral and axially out-of-parallel movement between the support and supported members by suitable deformation of the resilient pads.

And still another object of the present invention is the provision of a suspension system utilizing a plurality of normally axially aligned superimposed resilient pads wherein each of the pads are so constructed as to have a load-defection rate which increases with load so that the suspension systems is particularly useful in light weight vehicles that carry heavy loads such that relative smooth rides may be obtained in both the unloaded and loaded conditions.

By this invention, the above objects and others are accomplished by providing between normally axially spaced support and supported members a plurality of normally axially aligned superimposed precompressed resilient pad means. Guide means is operatively disposed through the superimposed resilient pad means for maintaining alignment therebetween and is operatively connected with the support and supported members for permitting relative axial, lateral and axially out-of-parallel movement therebetween. The resilient pad means are alternately compressible and expandable upon relative axial movement between the support and supported members for absorbing substantially all of the relative axial or axially parallel movement therebetween while cooperating with the guide means and support and supported members for permitting relative lateral and axially out-of-parallel movement between the support and supported members. Preferably the guide means comprises an elongate guide member that extends centrally through each of the axially aligned superimposed resilient pad means and has respective opposite end portions thereof slidably disposed through and beyond the support and supported members and being pivotal relative to each of the support and supported members. In addition, stop members are preferably carried by each of the opposite end portions of the elongate guide member and cooperate with the guide member and support and supported members for limiting relative axial movement of the support and supported members at least in a direction apart from each other. Each of the resilient pad means preferably comprises an elastomeric column having a circular cross-sectional area with opposite ends thereof having reduced cross-sectional areas compared to the central portion thereof and having a relation between length and cross-section which will prevent buckling under a compressive load applied between opposite ends. Bearing plates may be and preferably are positioned between adjoining ends of each of the elastomeric columns and project radially outside the associated ends of the columns whereby upon the application of a compressive load to the ends of the columns, they will bulge outwardly into load carrying contact with the adjacent bearing plates to increase the load carry area of the columns. By having the elastomeric columns so constructed, load-deflection rates are provided which increase with load to improve the performance of the suspension system of the present invention.

Some of the objects of the invention having been stated, other objects will appear as the description proceeds, when taken in connection with the accompanying drawings, in which:

FIG. 1 is a front elevational view with portions broken away of a suspension system constructed in accordance with the present invention and is there illustrated in a relatively unloaded condition;

FIG. 2 is a front elevational view with portions broken away of the suspension system of FIG. 1 when in a relatively axially loaded condition;

FIG. 3 is a front elevational view with portions broken away and parts in section of the suspension system of FIGS. 1 and 2 when in a relatively axially loaded condition and accommodating relative lateral movement between the support and supported members;

FIG. 4 is an enlarged sectional view of one of the resilient pad means of the suspension system of FIGS. 1-3; and FIG. 5 is a graphic illustration representing the load-deflection characteristics of both the entire suspension system and individual resilient pad means of the present invention.

Referring more specifically to the drawings wherein like reference characters are employed to indicate like parts, there is illustrated in FIGS. 1-3 a suspension system, generally designated at 10, constructed in accordance with the present invention. As illustrated, the suspension system 10 comprises support and supported members 11 and 12 normally disposed in axially spaced relation to each other. While the support and supported members 11 and 12 will normally be disposed in vertical alignment, as in FIGS. 1 and 2, it is not essential with the suspension system of the present invention. However, the suspension system 10 will be hereinafter described wherein the support member 11 and supported member 12 are normally vertically aligned. In the various Figures, both the support member 11 and supported member 12 are generally U-shaped brackets with web portions 11a and 12a, respectively, being opposed and in axially spaced relation to provide spaced apart support and supported surfaces. When the suspension system 10 is utilized in a vehicle, such as a light weight off-highway vehicle, the support member 11 will typically be carried by the axle (not shown) and the supported member 12 will be carried by the vehicle frame (not shown). In this manner the suspension system 10 is operatively disposed in the vehicle for providing suspension between the axle and vehicle frame. A plurality of the suspension systems 10 may be utilized in a single vehicle either alone or in cooperation with other suspension systems.

A plurality of normally axially aligned superimposed precompressed resilient pad means, generally indicated at 15, are disposed in load carrying relation between the web portions 11a and 12a of support member 11 and supported member 12, respectively. With reference to FIG. 4, each of the resilient pad means 15 includes an elongate elastomeric column 16 having a cylindrical aperture 17 disposed axially therethrough. The column 16 preferably has a circular cross-sectional area with opposite ends 16a and 16b thereof having reduced diameters compared to the central portion 16c, the reasons for which will be hereinafter explained. As illustrated, the diameter of the column 16 progressively increases from opposite ends 16a and 16b toward the central portion 16c such that the outer surface between ends 16a and 16b defines a convex curve. In addition, the length to diameter ratio should be such that the column 16 will not buckle upon the application of a compressive load between opposite ends thereof. The critical dimensions at which buckling takes place are well understood in the art and are empirically derived. Accordingly, a detailed discussion of this aspect will not be given. Rigid annular end plates 18 and 19 are embedded and bonded into the opposite ends 16a and 16b, respectively, of column 16 such as by conventional metal-elastomer adhesives. As shown, the end plates 18 and 19 are concentrically disposed about the aperture 17 of column 16 and have a diameter slightly less than that of the associated ends 16a and 16b. These end plates 18 and 19 provide for increased load carrying capacity for the elastomeric column 16, provide for load carrying contact with other members to be described and facilitate the maintenance of alignment between superimposed resilient pad means 15.

One end 16a of the elastomeric column 16 carries a stacking member 20. As illustrated in FIG. 4, the stacking member 20 has a generally cylindrical configuration and is suitably carried by plate 18 and extends upwardly therefrom. As will be apparent, the stacking member 20 may be formed integrally with end plate 18 or assemblied to end plate 18 prior to or after bonding to the elastomeric column 16 or otherwise positioned in the same operative relation to the elastomeric column 16. The diameter of the stacking member 20 is substantially equivalent to but slightly less than the inside diameter of the aperture 17 in column 16. The end of stacking member 20 remote from end plate 18 is beveled or tapered inwardly or otherwise contoured to facilitate insertion of same into end 16b of another resilient pad means 15 to axially stack and interconnect same to prevent relative lateral movement between same. In addition, the stacking member 20 has an aperture 21 extending centrally therethrough which is axially aligned relative to the aperture 17 in the column 16 and which has the shape of back-to-back frusto-conical members with the ends of smallest diameter connecting. An annular bushing 22 is received in an annular recess 23 in the stacking member 20 and communicates with the aperture 21 at its smallest diameter.

Within the suspension system 10, the resilient pad means 15 are stacked or superimposed one upon the other with the stacking member 20 carried by a lower resilient pad means 15 being received in the adjacent upper resilient pad means 15 to facilitate stacking and provide interconnection between same which aligns the resilient pad means 15 relative to one another and also prevents lateral movement of one relative to another. Rigid annular bearing plates 25 are disposed between adjacent resilient pad means 15 and between resilient pad means 15 and support and supported members 11 and 12. As best illustrated in FIG. 3, the plates 25 between adjacent resilient pad means 15 are concentrically disposed over stacking members 20 and bear against ends plates 18 and 19 of adjacent resilient pad means 15. The plates 25 between resilient pad means 15 and support and supported members 11 and 12 are preferably anchored to support and supported members 11 and 12 and resilient pad means 15 so that the same are mechanically coupled together. This anchoring may be provided as in FIG. 3 by stacking members 20 carried by the terminal resilient pad means 15 or terminal bearing plates 25 and received in enlarged apertures 31 and 32 in the support and supported members 11 and 12, respectively. However, friction between these members may also be relied on to effectively provide a mechanical coupling.

Guide means in the form of a continuous elongate rigid member 30 is slidably and centrally disposed through each of the superimposed resilient pad means 15, and stacking members 20 with opposite end portions thereof disposed through the enlarged apertures 31 and 32 in the web portions 11a and 12a of support and supported members 11 and 12, respectively, and beyond same. The guide member 30 thus may freely slide and pivot relative to support and supported members 11 and 12. The opposite end portions of guide member 30 extending through and beyond support and supported members 11 and 12 have carried thereby stop means, generally indicated at 35. Each of the stop means 35 are identical and comprise a washer 36 carried on guide member 30 and nut 37 threadable received on guide member 30 to maintain the washers 36 within predetermined spaced locations on guide member 30. An elastomeric member 38 is also carried by the guide member 30 inwardly of each of the washers 36 and are preferably bonded to washers 36 such as by a metal-elastomer adhesive. Both the washers 36 and elastomeric members 38 are sufficiently large to engage the support and supported members 11 and 12 and not be pulled through the apertures 31 and 32 therein.

Having described the structure of the preferred embodiment of the present invention, attention will now be given to operation of the suspension system 10. With reference to FIGS. 1 and 2, there is illustrated the suspension system 10 wherein the supported member 12 is in a relatively unloaded condition, FIG. 1, and a relatively axially loaded condition, FIG. 2. In the unloaded condition, FIG. 1, the resilient pad means 15 are precompressed between the support and supported members 11 and 12 and the stop means 35 are prepositioned on guide member 30 to maintain the precompression. The extent of precompression will be a matter of choice but the load-deflection properties of the suspension system 10 and weight to be supported in both the relatively unloaded and loaded conditions should be considered. By precompressing the resilient pad means 15, they will be alternately compressible and expandable upon relative axial movement or directions parallel thereto between members 11 and 12. That is, should the support and supported members 11 and 12 move in a direction axially away from each other the resilient pad means 15 will be allowed to expand. However, upon such expansion the elastomeric members 38 will provide snubbing action or resistance to this expansion which expansion will be ultimately limited by the combined action of the stop means 35 and elastomeric members 38. Should the support and supported members 11 and 12 move in a direction axially toward each other such as by the addition of a load to the supported member 12, the resilient pad means 15 will be further compressed as illustrated in FIG. 2. With regard to the stop means 35 and elastomeric members 38, it will be noted that they may as in the present embodiment permit unlimited relative axial movement of the support and supported members 11 and 12 in a direction toward each other. However, various means may be provided where desirable to limit relative axial movement in both directions.

The load-deflection characteristics of individual resilient pad means 15 and/or the cumulative load-deflection characteristics of the superimposed resilient pad means 15 in the suspension system 10 is illustrated by Curve I of FIG. 5. It will be noted that as load increases, the load-deflection or spring rate increases. Curve II shows the load-deflection characteristics of a conventional spring device wherein the load-deflection or spring rate is constant. To appreciate why the resilient pad means 15 exhibit load-deflection characteristics like that of Curve I of FIG. 5, a comparison of the resilient pad means 15 in FIGS. 1 and 2 should be made. Upon compression of a resilient pad means 15, the elastomeric column 16 bulges outwardly into contact with adjacent bearing plates 25 to increase the load carrying area of the elastomeric column 16 which increases the load carrying area of the ability thereof. Contrary, upon expansion of a resilient pad means 15, the elastomeric column 16 contracts inwardly away from bearing plates 25 to decrease the load carrying area thereof. The load-deflection properties of the suspension system are highly useful for absorbing shock and particularly so in light weight vehicles that carry heavy loads. It can be seen that under a given load condition, upon the suspension system encountering shock, it is inherently adapted to minimize the total deflection under varying shock conditions without sacrificing the shock absorption properties thereof. Perhaps of more importance is that the suspension system 10 will provide good shock absorption under a variety of load conditions without substantial differences in total deflection of the suspension system 10. Another important aspect is that when the suspension system encounters a severe shock, it will not bottom out abruptly and cause a severe shock to that being supported.

In addition to the foregoing, the suspension system 10 will accommodate relative lateral and axially out-of-parallel movement between the support and supported members 11 and 12. With reference to FIG. 3, when relative lateral movement is urged between support and supported members 11 and 12, the guide member 30 pivots relative to the support and supported members 11 and 12 and cooperates with the stacking members 20 to cause elastomeric columns 16 of resilient pad means 15 to be uniformly deformed in shear to accommodate the relative lateral movement without substantial interference with the axial load carrying ability of the suspension system 10. While the elastomeric columns 16 of resilient pad means 15 are more readily deformable in shear than in compression, they will provide some absorption of lateral shock. However, in most instances specific lateral shock absorbing devices or means for limiting relative lateral movement will be used in combination with the suspension system 10 of this invention.

For purposes of this invention axially out-of-parallel movement or cocking between the support and supported members 11 and 12 is when the support and supported members 11 and 12 move into non-parallel relation with each other. By way of example, when the suspension system 10 is used in a vehicle as a suspension between the axle and vehicle frame, axially out-of-parallel movement between the support and supported members 11 and 12 occurs when the axle moves out-of-parallel relation with the vehicle frame. This suspension system 10 will accommodate this relative movement in that the resilient pad means 15 may be preferentially compressed or allowed to expand on one side of the guide member 30.

In the drawings and specification, there has been set forth a preferred embodiment of the invention and, although specific terms are employed, they are used in a generic and descriptive sense only and not for purposes of limitation.

What is claimed is:

1. In a suspension system for a vehicle or the like,
a support and supported member normally disposed in axially spaced relation and subject to loads urging them toward each other,
a plurality of superimposed normally axially aligned precompressed resilient pad means disposed in compressive load carrying relation between said support and supported members, and
continuous elongate rigid guide means operatively disposed through and cooperating with each of said superimposed resilient pad means for maintaining alignment therebetween along said guide means and being operatively interconnected normally in nonload transmitting relation with said support and supported members for normally permitting both free relative axial and lateral movement therebetween,
said resilient pad means being alternately compressible and expandable upon relative axial movement between said support and supported members for absorbing substantially all of the relative axial movement therebetween and each of said resilient pad means cooperating with said guide means for resiliently permitting relative lateral movement between said support and supported members.

2. In a suspension system, as set forth in claim 1, including stop means carried by said guide means for limiting the relative axial movement between said support and supported members in at least one direction.

3. In a suspension system, as set forth in claim 2, wherein said stop means limit relative axial movement between said support and supported members in a direction apart from each other while permitting unlimited relative axial movement thereof in a direction toward each other.

4. In a suspension system, as set forth in claim 1, wherein said guide means comprises a guide member extending centrally through each of said superimposed resilient pad means and having respective opposite end portions thereof slidably disposed through and beyond said support and supported members and being pivotal relative to each of said support and supported members.

5. In a suspension system, as set forth in claim 4, including stop means carried by each of said opposite end portions of said elongate guide member and cooperating with said guide member and support and supported members for limiting relative axial movement of said support and supported members in a direction apart from each other.

6. In a suspension system, as set forth in claim 5, including an elastomeric member carried by each of said opposite end portions of said elongate guide member inwardly of said stop means and cooperating with said stop means for engaging said support and supported members upon a predetermined relative axial movement thereof in a direction apart from each other to provide snubbing in the rebound direction.

7. In a suspension system, as set forth in claim 1, wherein said plurality of superimposed resilient pad means effectively has a compressive load-deflection rate in the axial direction which increases with load.

8. In a suspension system, as set forth in claim 7, wherein each of said resilient pad means effectively has a compressive load-deflection rate which increases with load.

9. In a suspension system, as set forth in claim 8, wherein each of said resilient pad means comprises an elastomeric column having a circular cross-sectional area with opposite ends having a reduced diameter compared to the central portion thereof and having a relation between length and cross-sectional area which will prevent buckling under a compressive load applied between opposite ends thereof and including a bearing plate positioned between adjacent ends of each of said elastomeric columns, each of said bearing plates projecting radially outside the associated ends of the columns whereby upon the application of a compressive load to the ends of said columns they will bulge outwardly into load carrying contact with the adjacent plates to increase the load carrying area and load carrying ability of said columns.

10. In a suspension system, as set forth in claim 9, wherein the outer surface of each of said columns between opposite ends thereof is convex.

11. In a suspension system, as set forth in claim 1, including stacking means disposed between and interconnecting adjacent resilient pad means, said stacking means cooperating with said guide means upon relative lateral movement between said support and supported members for uniformly deforming each of said resilient pad means to resiliently permit said relative lateral movement.

12. In a suspension system for a vehicle or the like,
a support and supported member normally disposed in axially spaced relation and subject to loads urging them toward each other,
a plurality of superimposed normally axially aligned precompressed elastomeric columns disposed in compressive load carrying relation between said support and supported members,
annular stacking means disposed between and interconnecting adjacent elastomeric columns, and
a continuous elongate rigid guide member disposed centrally through each of said elastomeric columns and stacking means and cooperating therewith for maintaining alignment therebetween along said guide means and having opposite end portions operatively associated with said support and supported members for normally free pivotal movement relative thereto and at least one of said end portions being slidably disposed through and beyond one of said support and supported members for permitting normally free relative axial movement between said support and supported members,
said elastomeric columns being alternately compressible and and expandable upon relative axial movement between said support and supported members for absorbing substantially all of the relative axial movement therebetween and each of said stacking means cooperating with said guide member upon relative lateral movement between said support and supported members for uniformly deforming each of said elastomeric columns to resiliently permit said relative lateral movement.

13. In a suspension system, as set forth in claim 12, wherein each of said opposite end portions of said elongate guide member are slidably disposed through and beyond one of said support and supported members, and including stop means carried by each of said opposite ends of said guide member and cooperating with said guide member and support and supported members for limiting relative axial movement between said support and supported members in a direction apart from each other.

* * * * *